(12) United States Patent
Craft et al.

(10) Patent No.: US 7,930,327 B2
(45) Date of Patent: Apr. 19, 2011

(54) METHOD AND APPARATUS FOR OBTAINING THE ABSOLUTE PATH NAME OF AN OPEN FILE SYSTEM OBJECT FROM ITS FILE DESCRIPTOR

(75) Inventors: David Jones Craft, Austin, TX (US); Srikanth Vishwanathan, Maharashtra (IN)

(73) Assignee: International Business Machines Corporation, Armonk, NY (US)

( * ) Notice: Subject to any disclaimer, the term of this patent is extended or adjusted under 35 U.S.C. 154(b) by 366 days.

(21) Appl. No.: 11/751,455

(22) Filed: May 21, 2007

(65) Prior Publication Data
US 2008/0294703 A1    Nov. 27, 2008

(51) Int. Cl.
*G06F 17/30* (2006.01)
(52) U.S. Cl. ......................................... 707/826; 707/615
(58) Field of Classification Search .................. None
See application file for complete search history.

(56) References Cited

U.S. PATENT DOCUMENTS

| | | | | |
|---|---|---|---|---|
| 5,539,885 | A | * | 7/1996 | Ono et al. ..................... 709/203 |
| 5,724,512 | A | * | 3/1998 | Winterbottom ................. 707/10 |
| 6,795,966 | B1 | | 9/2004 | Lim et al. |
| 6,963,923 | B1 | | 11/2005 | Bennett |
| 7,099,866 | B1 | | 8/2006 | Crosbie et al. |
| 7,272,654 | B1 | * | 9/2007 | Brendel .......................... 707/10 |
| 7,577,834 | B1 | * | 8/2009 | Traversat et al. ............. 713/156 |
| 2005/0262411 | A1 | | 11/2005 | Vertes et al. |
| 2006/0041786 | A1 | | 2/2006 | Janakiraman et al. |
| 2007/0088702 | A1 | * | 4/2007 | Fridella et al. .................. 707/10 |

FOREIGN PATENT DOCUMENTS

| | | |
|---|---|---|
| FR | 2843210 | 6/2004 |
| WO | WO2004015513 | 2/2004 |
| WO | WO2006010812 | 2/2006 |

OTHER PUBLICATIONS

"A Checkpoint and Restart mechanism for parallel programming systems—Messages and Queues", Sameer Paranjpye, pp. 1-4, retrieved May 14, 2007 http://charm.cs.uiuc.edu/papers/SameerThesis.www/node13.html.
"Solaris Internals: Solaris 10 and OpenSolaris Kernel Architecture", Second Edition, retrieved Mar. 20, 2007. http://safari5.bvdep.com/0131482092/ch14lev1sec9.

(Continued)

*Primary Examiner* — Debbie Le
*Assistant Examiner* — Thomas Meng
(74) *Attorney, Agent, or Firm* — Matthew W. Baca; Amy J. Pattillo

(57) ABSTRACT

A computer implemented method, apparatus, and computer program product for obtaining an absolute path name for an open file system object. A file descriptor for the open file system object is identified in response to a process in a first software partition opening a file system object to form the open file system object. The absolute path name for the open file system object is cached in a path name field in a file structure associated with the file descriptor for the open file system object. The absolute path name for the open file system object in the path name field is used during migration of the first software partition to restore the open file system object in a second software partition.

14 Claims, 10 Drawing Sheets

OTHER PUBLICATIONS

"The Single UNIX Specification, Version 2, 1997", The Open Group, retrieved Mar. 20, 2007 http://opengroup.org/onlinepubs/007908799/xsh/fchdir.html.

Hutzelman, "[OpenAFS]MailDir & Coda/AFS was: Practical no. of files per dir was: [OpenAFS] Max number of files in volume?", retrieved Mar. 20, 2007 http://www.openafs.org/pipermail/openafs-info/2004-May/013499.html.

Ryabkov, "filesystem implementation questions", retrieved Mar. 20, 2007 http://lists.freebsd.org/pipermail/freebsd-hackers/2005-August/013133.html.

"Linux/Unix Information about the Linux/Unix chdir command" retrieved Mar. 20, 2007 http://www.computerhope.com/unix/uchdir.htm.

Krishnan et al., "Checkpoint and Restart for Distributed Components in XCAT3", Proceedings of the Fifth IEEE/ACM International Workshop on Grid Computing (GRID'04), 2004, pp. 281-288.

Sancho et al., "Current Practice and a Direction Forward in Checkpoint/Restart Implementations for Fault Tolerance", Proceedings of the 19th IEEE International Parallel and Distributed Processing Symposium (IPDPS'05), Workshop 18, vol. 19, 2005, pp. 1-8.

Zhong et al., "CRAK: Linux Checkpoint/Restart As a Kernel Module", Network Computing Lab, Columbia University, Technical Report CUCS-014-01, Nov. 2001, pp. 1-19 http://www.ncl.cs.columbia.edu/research/migrate/crak.html.

* cited by examiner

METHOD AND APPARATUS FOR OBTAINING THE ABSOLUTE PATH NAME OF AN OPEN FILE SYSTEM OBJECT FROM ITS FILE DESCRIPTOR

BACKGROUND OF THE INVENTION

1. Field of the Invention

The present invention is related generally to a data processing system and in particular to a method and apparatus for the migration of a software partition. More particularly, the present invention is directed to a computer implemented method, apparatus, and computer usable program code for obtaining the absolute path name of an open file system object from its file descriptor for utilization in migrating a software partition in a software partitioned environment.

2. Description of the Related Art

In a software partitioned environment, a single instance of the operating system can be partitioned into multiple virtual operating system environments. Each of these virtual operating system environments is known as a software partition. A software partition is a virtualized operating system environment within a single instance of the operating system. An example of a software partition is AIX® workload partition (WPAR), which is a product available from International Business Machines (IBM®) Corporation.

Software running within each software partition will appear to have its own separate instance of the operating system. A software partition may include one or more processes. Processes in a software partition are completely isolated from processes in other software partitions in the same system. They are not allowed to interact with processes in other software partitions in the same system.

A software partition, including any processes running in the partition, may be migrated from one physical computing device to another physical computing device, while still active. Migration of a software partition involves checkpointing the state of every process in the partition on one data processing system and then restoring the state of every process on another data processing system using the checkpoint data.

SUMMARY OF THE INVENTION

The illustrative embodiments provide a computer implemented method, apparatus, and computer usable program code for obtaining the absolute path name of an open file system object from a file descriptor. In one embodiment, a file descriptor for the open file system object is identified in response to a process in a first software partition opening a file system object to form the open file system object. The absolute path name for the open file system object is cached in a path name field in a file structure associated with the file descriptor for the open file system object. The absolute path name for the open file system object in the path name field is used during migration of the first software partition to restore the open file system object in a second software partition.

BRIEF DESCRIPTION OF THE DRAWINGS

The novel features believed characteristic of the invention are set forth in the appended claims. The invention itself, however, as well as a preferred mode of use, further objectives and advantages thereof, will best be understood with reference to the following detailed description of an illustrative embodiment when read in conjunction with the accompanying drawings, wherein:

DETAILED DESCRIPTION OF THE PREFERRED EMBODIMENT

Figure 1:
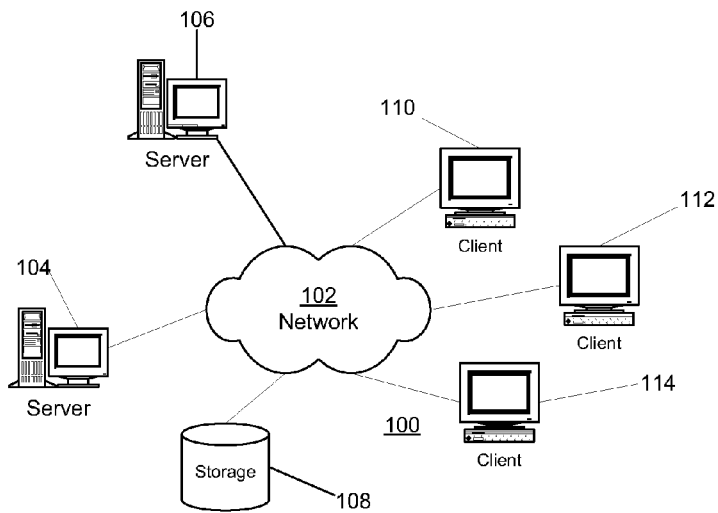
FIG. 1 is a pictorial representation of a network of data processing systems in which illustrative embodiments may be implemented.
Figure 2:
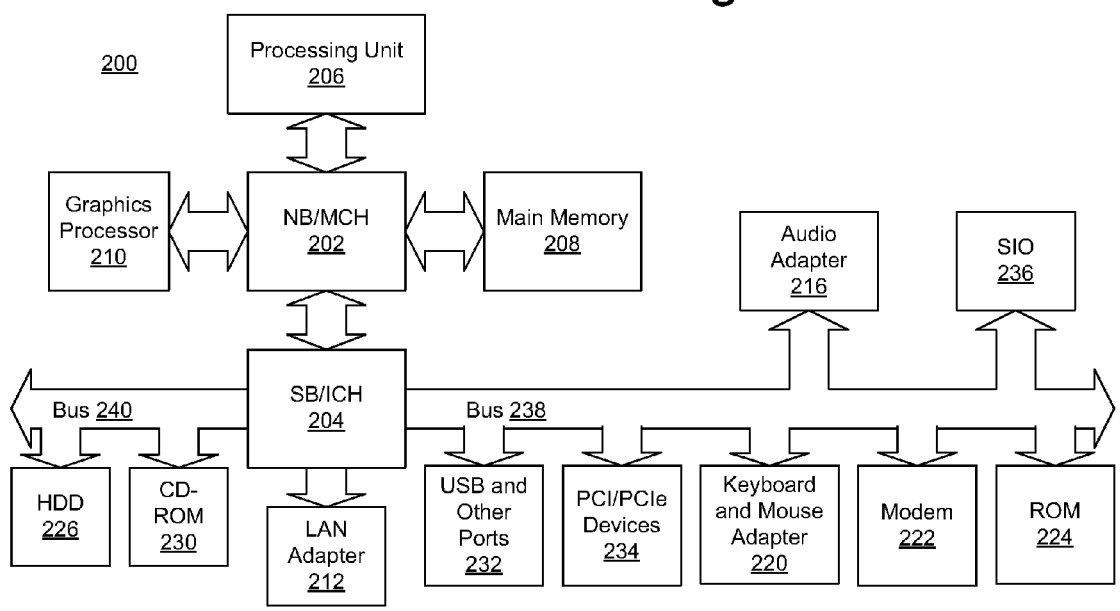
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In this example, server 104 and server 108 support a software partitioned environment.

In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 may also include software partitions. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments. Data processing system 200 supports a software partitioned environment that includes one or more software partitions.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200. Java and all Java-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

A software partition is a virtualized operating system environment within a single instance of the operating system. A single instance of the operating system can be partitioned into multiple virtual operating system environments. Each of these virtual operating system environments is known as a software partition. An example of a software partition is AIX® workload partition (WPAR), which is a product available from International Business Machines (IBM®) Corporation.

Software running within each software partition will appear to have its own separate instance of the operating system. A software partition may include one or more processes. Processes in one software partition are completely isolated from processes in other software partitions on the same data processing system. They are not allowed to interact with processes in other software partitions.

A software partition, including any processes running in the partition, may be migrated from one physical computing device to another physical computing device while still active. The processes and/or other content of a software partition may also be migrated into another software partition on the same physical computing device.

Migration of a software partition involves checkpointing the state of every process in the partition on a first data processing system and then restoring the state of every process on a second partition using the checkpoint data. As used herein, the second partition may be a different partition located on the first data processing system or a different partition located on a different data processing system than the first data processing system.

A checkpoint operation is a data integrity operation in which the application state and memory contents for an application are written to stable storage at a particular time to provide a basis upon which to recreate the state of an application and/or processes running in a software partition, such as when a software partition is migrated from one physical computing device to another physical computing device. The process by which the state and memory contents are written to stable storage may be referred to as a checkpoint.

The illustrative embodiments recognize that one of the most important components of the process state is the path name of the application binary and the path names of all the file system objects opened by a process running in a first software partition. The process cannot be migrated or restarted on the second partition without the path names of all the file system objects opened by the process.

However, the path names of the application or the file system objects opened by the application are usually not readily available because most kernels, such as UNIX® kernels, convert path names to file descriptors using a "name lookup" algorithm before performing any operations on the objects. Operations performed on objects may include, without limitation, read operations and write operations. In fact, most UNIX® kernels do not maintain any state that allows the direct conversion of the file descriptors back to their path names.

When a software partition is migrated to a different machine, a checkpoint operation is performed to obtain and store information regarding applications and/or processes running in the software partition. The state data may be saved into a state file on a local disk, a network disk, or any other data storage device. Checkpoint operations are performed at various pre-defined points in time to generate checkpoint data. In this manner, a software partition migration operation may be performed to move a software partition onto a different physical computing device and/or into a different software partition on the same physical computing device using the checkpoint data to recreate the state of all processes running in the software partition at the last checkpoint into a new software partition.

The illustrative embodiments provide a computer implemented method, apparatus, and computer usable program code for obtaining the absolute path name of an open file system object. In one embodiment, the absolute path name of the open file system object associated with a process running in the departure software partition is identified in response to the process in the departure software partition opening the file system object to obtain a file descriptor. The absolute path name of the open file system object is cached in a path name field in a file structure associated with a file descriptor for the open file system object. The absolute path name for the open file system object cached in the path name field in the file structure is saved to a state file associated with the software partition. The absolute path name for the open file system object saved in the state file is used to restore the state of the open file system object in the arrival software partition after migration.

In one embodiment, the process is a process in a set of processes associated with the departure software partition. A departure software partition is a first software partition on a computing device that is being migrated to a different computing device and/or a different software partition on the same computing device. A set of processes may include one or more processes.

In this example, the absolute path name for the open file system object is cached in a path name field in the file structure in response to a determination that the departure software partition is a mobile software partition that is capable of being migrated to the arrival software partition. The arrival software partition is a different software partition than the departure software partition. In other words, the arrival software partition is a second software partition on a departure computing device that is being migrated to an arrival computing device to form the arrival software partition.

In response to migrating the set of processes from the first software partition to the second software partition, a kernel associated with the second software partition retrieves the absolute path name of the open file system object from the state file. The absolute path name retrieved from the state file is used to restore the state of the open file system object in the second software partition.

Figure 3:
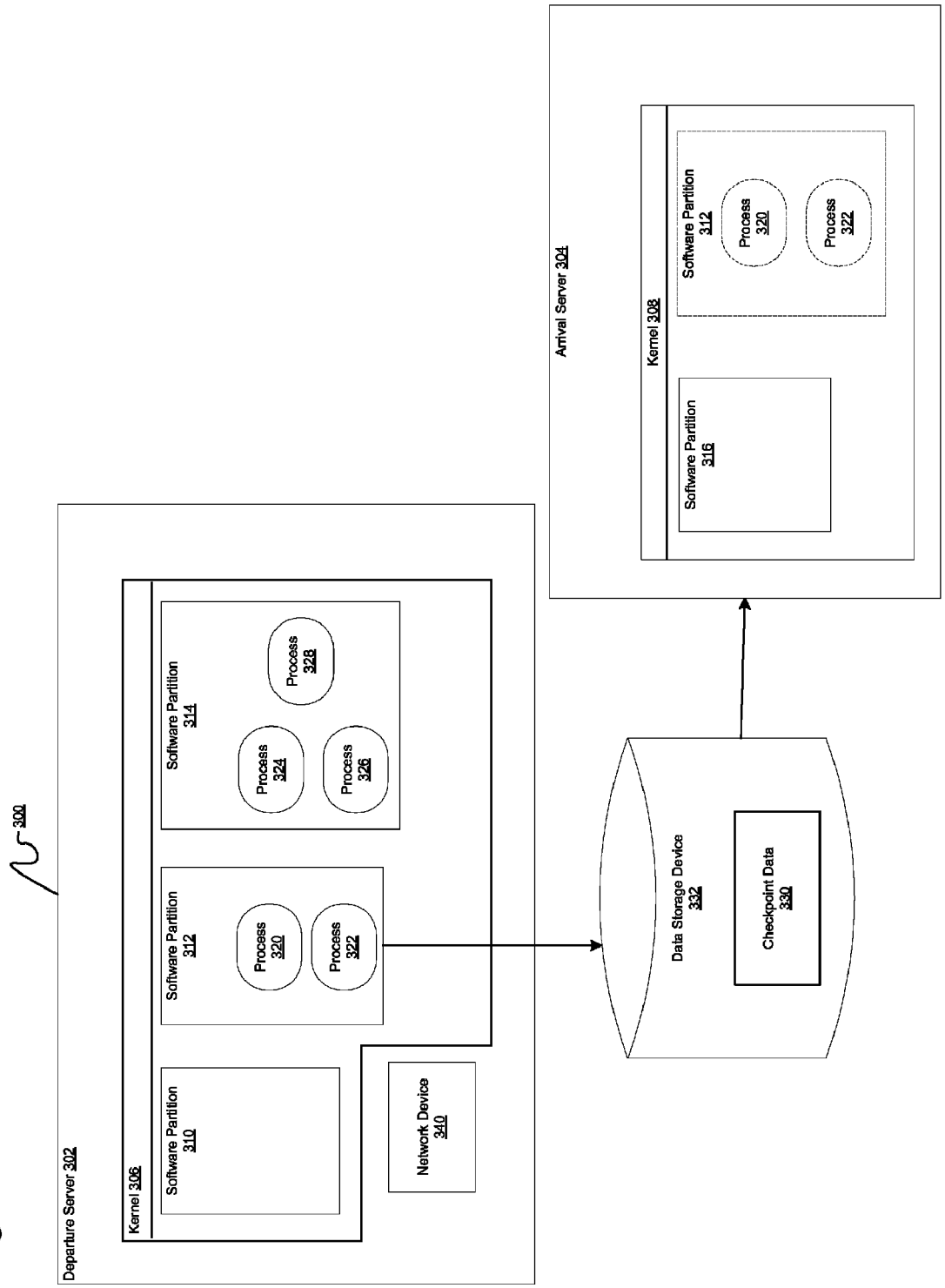
FIG. 3 is a block diagram illustrating the checkpoint process during the migration of a software partition in accordance with an illustrative embodiment.

FIG. 3 is a block diagram illustrating a checkpoint process during the migration of a software partition in accordance with an illustrative embodiment. Data processing system 300 may be implemented in any type of network data processing system, including, without limitation, data processing system 100 in FIG. 1.

Departure server 302 and arrival server 304 are servers supporting a software partitioned environment. Departure server 302 is the server on which the software partition is located before migration. Arrival server 304 is the server on which the software partition is located after migration. When a software partition is migrated, it "departs" from departure server 302 and "arrives" on arrival server 304. The software partition on departure server 302 may be referred to as a first software partition or a departure software partition. The software partition on arrival server 304 after migration of the software partition to arrival server 304 may be referred to as a second software partition or an arrival software partition. Departure server 302 and arrival server 304 may be implemented in any type of computing device, such as, but not limited to, server 104 in FIG. 1.

Kernel 306 and kernel 308 are software processes for managing resources on data processing system 300, such as, without limitation, processor resources, input and output (I/O) resources, and memory resources on a computing device. In other words, kernel 306 is an abstraction layer between hardware and software on departure server 302 and kernel 308 is an abstraction layer between hardware and software on departure server 306.

Departure server 302 includes one or more software partitions for partitioning the operating system image within kernel 306 into multiple virtual operating system instances. In this example, departure server 302 includes software partitions 310-314. Arrival server 304 includes software partition 316. However, a server, such as departure server 302, is not limited to three software partitions. In accordance with the illustrative embodiments, a computing device, such as departure server 302 or arrival server 304, may include any number of software partitions in accordance with the illustrative embodiments.

Each software partition may include one or more processes. A process is an executing instance of a computer program or application, a task, or an operation being performed on data. In other words, a process executes the instructions in a computer program. In this example, software partition 312 includes processes 320-322 and software partition 314 includes processes 324-328.

If a user wants to migrate software partition 312 from departure server 302 to arrival server 304, a checkpoint process (not shown) associated with each process running on software partition 312 must first save state data for each process to checkpoint data 330.

Checkpoint data 330 is a set of state files on data storage device 332 for storing state data regarding processes running on a software partition. The state of each process in a software partition can be stored in one file. If a software partition had ten processes running on the software partition, checkpoint data 330 would contain ten state files. In this example, checkpoint data 330 stores checkpoint state data for processes 320-322 running in software partition 312.

A checkpoint process is a software component of a given process that gathers process state data, data regarding open files and open sockets bound to the process, and any other information regarding the current state of a process in software partition 312. The state data may then be used to recreate or re-establish each process running in software partition 312 to the same state that existed at the time the checkpoint process gathered the checkpoint data. The time a checkpoint process gathers checkpoint data may be referred to as a checkpoint time.

Information stored on a disk is typically organized into collections of data referred to as files. A file may contain a program, data to be processed by a program, the results generated by a program, or any other data. Checkpoint data 330 is state information for a given software partition. In other words, each software partition on departure server 302 has an associated state file for storing checkpoint data for processes running in that software partition. In this example, checkpoint data 330 stores state information for software partition 312.

Checkpoint data 330 is stored in data storage device 332. Data storage device 332 is any type of known or available device for storing data, including, without limitation, a hard disk, a compact disk (CD), a compact disk rewrite-able (CD-RW), a compact disk read-only memory, a non-volatile random access memory (NV-RAM), a flash memory, or any other type of data storage device. Data storage device 332 may be located locally to departure server 302 and/or arrival server 304 or remotely to departure server 302 and/or arrival server 304.

In this example, data storage device 332 is located remotely to departure server 302. In other words, data storage device 332 is implemented using one or more network data storage devices that are accessible to departure server 302 and/or arrival server 304 via a network connection, such as network 102 in FIG. 1. For example, data storage device 332 may include one or more remote data storage devices, such as storage unit 108 in FIG. 1. A network connection may be enabled via a network device associated with departure server 302 and/or arrival server 304.

A network device (not shown) is any type of network access software known or available for allowing a computing device to access a network. The network device connects to a network connection. The network connection permits access to any type of network. For example, a network may include, but is not limited to, a local area network (LAN), a wide area network (WAN), the Internet, an intranet, an Ethernet, a wireless network, or any other type of network.

In another embodiment, data storage device 332 is located locally to departure server 302 and data stored in data storage device 332 is shared or made accessible to arrival server 304 using other protocols, such as file transfer protocols (FTP), and/or any other protocols for accessing data in a data storage device.

In this example, data storage device 332 is a single data storage device. However, in accordance with the illustrative embodiments, data storage device 332 may include two or more data storage devices. For example, data storage device 332 may include any combination of a local hard disk, a local non-volatile random access memory, and/or a remote hard disk that is accessible to arrival server 304 over a network connection.

In this example, software partition 312 is being migrated from departure server 302 to arrival server 304. If any process running in software partition 312, such as process 320, has an open file system object, kernel 306 obtains the absolute path name of the open file system object from the application that opened the file system object.

When a file system object is opened by an application, either the absolute path name or the relative path name of the file system object is available to the kernel. If the path is an absolute path name, the absolute path name can directly be cached in the special path name field in the file structure associated with the open file system object.

However, relative path names need to be normalized or converted to an absolute path name before caching the path name in the file structure associated with the open file system object. Normalizing the relative path name is accomplished by combining the absolute path name of the application's current working directory and the relative path name of the open file system object passed by the application when the file system object is opened.

The absolute path name of the open file system object obtained from the application may be referred to as additional file system state information. Kernel 306 maintains the additional file system state information for the open file system objects in a file structure representing the open file system object. Kernel 308 in arrival server 304 uses the state information in checkpoint data 330 and additional state information stored in the file structure for open file system objects to migrate or recreate software partition 312 that was originally located on departure server 302 onto arrival server 304.

The open file system object is an object in a file system associated with departure server 302. A file system is a method for storing and organizing electronic files on a computer. File systems may use data storage devices, such as, without limitation, hard disks or flash memory, to store the files. A file system object is an object within the file system. A file system object may be a file storing data, a device, a named pipe, a directory that includes files or other directory objects.

Figure 4:
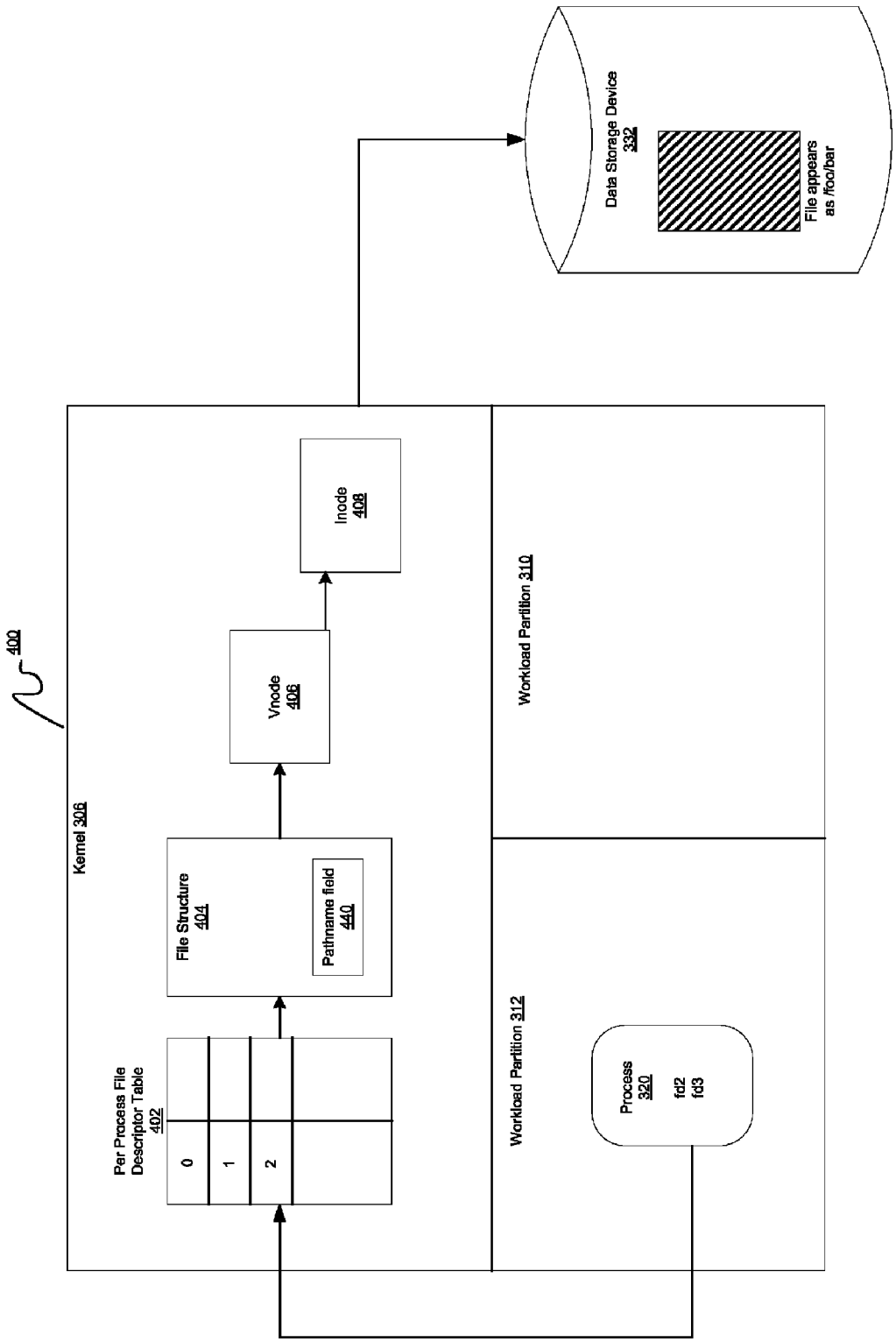
FIG. 4 is a block diagram illustrating an open file system object in a software partition in accordance with an illustrative embodiment.

Referring now to FIG. 4, a block diagram illustrating an open file system object in a software partition is shown in accordance with an illustrative embodiment. Data processing system 400 may be implemented in any type of computing device, such as server 104 in FIG. 1 or departure server 302 in FIG. 3.

Each process running in a software partition has its own kernel resident file descriptor table, referred to as a per process file descriptor table, such as per process file descriptor table 402. In this example, per process file descriptor table 402 is a file descriptor table for a process, such as process 320 running in software partition 312. Per process file descriptor table 402 includes an entry for each file system object opened by the process.

When process 320 opens a file system object, an entry is created in per process file descriptor table 402 for the open file system object. The entry for a file system object includes the file descriptor for the file system object. A file descriptor is an index or identifier for an entry in per process file descriptor table 402. The file descriptor can refer to a file or a directory. In this example, file descriptor "2" in per process file descriptor table 402 identifies file structure 404.

File structure 404 is a data structure representing an open file system object. File structure 404 includes a pointer to vnode 406. Vnode 406 is a virtual node for the open file system object in the virtual file system (VFS). The virtual file system is an abstraction layer on top of the physical file system. The virtual file system provides an interface or contract between the kernel and the physical file system. A virtual node is an abstraction representing an open file system object in the virtual file system.

Vnode 406 contains a pointer to inode 408. Inode 408 is a data structure in the physical file system containing information regarding the file system object. For example, inode 408 includes the date the file was created, the file size and the location of the file on data storage device 332. The information in inode 408 regarding the location of the file on data storage device 332 is used to locate the file so that a process can perform a read, write, copy, delete, or other operation on the file.

In this example, a path name field 340 is added to file structure 404. When a file is opened to form an open file system object and the absolute path name for the open file system object is obtained from the application, kernel 306 stores the absolute path name of the open file system object in path name field 340 in addition to storing the file descriptor for the open file system object in the per process file descriptor table 402. The absolute path name stored in path name field 340 may then be used during a migration operation to restore the state of the open file system object in a second software partition on data processing system 400 or in a different software partition located on a different physical data processing system, such as arrival server 304 in FIG. 3.

In other words, when software partition 312 is migrated, the absolute path names of all open file system objects associated with processes running in software partition 312 only need to be copied out of the file structure and into a state file. The absolute path name information in the state file can then be used to restore the state of all open file system objects associated with the processes running in software partition 312 after migration of the processes in software partition 312 to the new partition. The new partition may be located on the same physical computing device or located on a different physical computing device.

Figure 5:
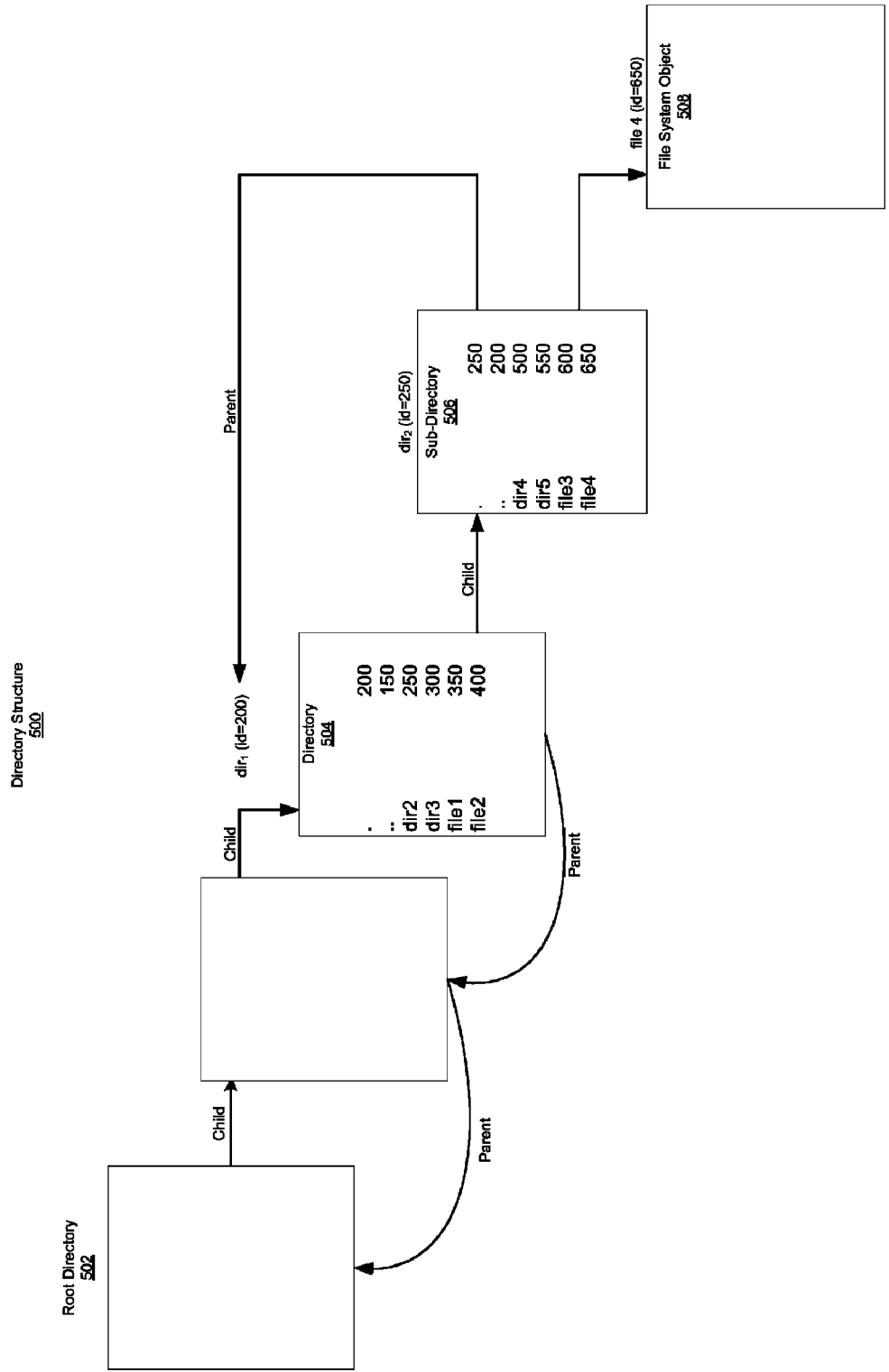
FIG. 5 is a block diagram illustrating a process for identifying a reference to a parent directory in accordance with an illustrative embodiment.

Turning now to FIG. 5, a block diagram illustrating a process for identifying a reference to a parent directory is shown in accordance with an illustrative embodiment. Directory structure 500 is an illustration of a directory hierarchy for a file system object in a file system.

In a file system, files are usually organized into directories. A directory may contain files, as well as other directories. In other words, a directory may include one or more subdirectories. Each subdirectory may store files and/or other subdirectories. A directory which has sub-directories may be referred to as a parent directory of the sub-directory.

Files in a file system are typically identified by a file name. The file name may include many components. Each component in the file name identifies a directory or sub-directory in which the file object is located. For example, if a file named "apple pie" contains a recipe, and the file is located in a sub-directory titled "Desserts" which is located in a parent directory called "Mom's recipes", a path name for the file "apple pie" could include a component for the file, a component for the sub-directory "Desserts" and a component for the parent directory "Mom's recipes."

Typically, a file system has one root directory, such as root directory 502. All other directories on the file system are sub-directories of root directory 502. In other words, root directory 502 has no parent directory, but root directory 502 is a parent directory to every other directory in the file system.

Directory 504 is a sub-directory of root directory 502. In this example, directory 504 includes a directory object "dir2" identified by file identifier "250." Directory object "dir2" is itself sub-directory 506 of parent directory 504. Sub-directory 506 includes files and other sub-directories. For example, sub-directory 506 includes "file4" which is file system object 508. Files, such as file system object 508, is the last component in the absolute path name for file system object 508. File system object 508 does not include other files or sub-directories.

A path is a file or directory name. A relative path name provides a file or directory location relative to the current working directory that a user happens to be working out of when the relative path name is generated. For example, if a user is in sub-directory 506, sub-directory 506 is the current working directory. A file system object may not be locatable using the relative path name if the user subsequently moves or changes to a different working directory because the relative path name identifies a file system object location relative to a particular directory.

The absolute or complete path name is a path that points to the location of a file or directory that is the same regardless of the user's current working directory. An absolute path name typically identifies a file or directory location by reference to the root directory. In this example, the absolute path name for file system object 508 would include a component for sub-directory 506, directory 504, and root directory 502. The last component in the absolute path name can be a file or a directory, such as file system object 508. All other components in the absolute path name, other than the last component, are always directories.

Thus, in accordance with the illustrative embodiments, the absolute path name for a file system object is stored in a path name field in the file structure representing the open file system object, such as path name field 440 in FIG. 4, when the file system object is opened. The saved absolute path name can be used to identify the open file system object's location on data storage device 332 regardless of the current working directory.

In this example, when a process opens file system object 508, the process and/or the user provides the kernel with the absolute path name for the file system object. If the process and/or user provides a relative path name rather than the absolute path name, the kernel converts or normalizes the relative path name for the file system object to the absolute path name.

The relative path name may be easily converted to an absolute or complete path name if the absolute path name of the application's current working directory is known. In such a case, the absolute path name of the open file system object may be obtained simply by concatenating the absolute path name of the application's current working directory and the relative path name of the open file system object passed by the application.

Additional normalization may need to be performed if the path name includes ". ." or ".", that is, the special entries that refer to the parent directory or the current directory. For example, if a file's path name is /one/two/three/. ./four/five/./six, it may be replaced by /one/two/four/five/six. In this example, the next component after "three" is ". .", that is, the parent directory of "three". But the parent directory of directory "three", directory "two" is already part of the path name. Hence, "three" and ". ." effectively cancel out each other and can be removed. Similarly, the "." following directory "five" has no value as it refers to the current directory at that point, that is, "five" itself, and can simply be discarded. The absolute path name obtained in this manner uniquely identifies the open file system object. The absolute path name of the application's current working directory is easily tracked with the help of the "chdir" and "fchdir" calls. This process is explained in greater detail below.

If a relative path name is received, the kernel first obtains the absolute path name of the application's current working directory. The current working directory may be changed after a process begins running by using a change directory (chdir) function or the fchdir function. The "chdir" function is used to change the current working directory to a different directory, parent directory, or sub-directory. The "fchdir" function is similar to the "chdir" function, except that the "fchdir" function accepts a file descriptor instead of a directory name.

If the current working directory is changed after the process started running by a "chdir" function, the "chdir" function updates the absolute path name of the current working directory every time the current working directory is changed. Therefore, the absolute path name of the current working directory is always accurate and available regardless of changes in the current working directory. The path name of the new current working directory is passed to the "chdir" function by the application that used the "chdir" function to change directories.

However, in the "fchdir" function, the new current working directory is not available as an argument. Instead, a reference to the directory is passed to the kernel in the form of a file descriptor. In this case, the absolute path name of the current working directory is determined using a special directory entry lookup method.

The special directory entry lookup method utilizes special directory entries to identify an absolute path name of the current working directory. In most file systems, such as UNIX® file systems, the parent directory of a file system object that is a directory can be obtained by looking up the special directory entry ". . " for identifying the parent directory.

The absolute path name can be obtained if the parent directory of the last component of an absolute path name is known, because UNIX® semantics guarantee that every component in the path name will be a directory except for the last component which may or may not be a directory. In this case, the last component is also a directory because the "fchdir" function always expects a reference to a directory.

The kernel obtains the name of the last component of the absolute path name for the current working directory by looking up the file identifier of the directory in the parent directory. In this example, the parent directory of directory 506 is directory 504. Because the directory 506, in this example, is not root directory 502, the kernel uses the special directory entry "." function to obtain the parent directory of directory 506. In this example, the parent directory of directory 506 is directory 504. The kernel then uses the identifier of directory 506, "id 250," in the parent directory 504 to obtain the name of directory 506 as "dir2".

Because directory 504 is not the root directory, the kernel continues the process of using the special directory entry ". . " function to obtain the parent directory and looks up the file identifier of directory 504 "id 200" in its parent directory to obtain the name of directory 504 as "dir1". This continues until root directory 502 is reached.

When the root directory is reached, the kernel concatenates all the components identified in the special directory entry lookup method in reverse order to obtain the absolute path name of the current working directory. Finally, the absolute path name of the current working directory is adjusted with reference to the root directory of the software partition because the processes running in a software partition open file system objects with reference to the software partition's root directory as opposed to the system's root directory.

The absolute path name of the current working directory is then cached by the kernel so that future changes to the current working directory using the chdir function can be easily tracked and updated.

Figure 6:
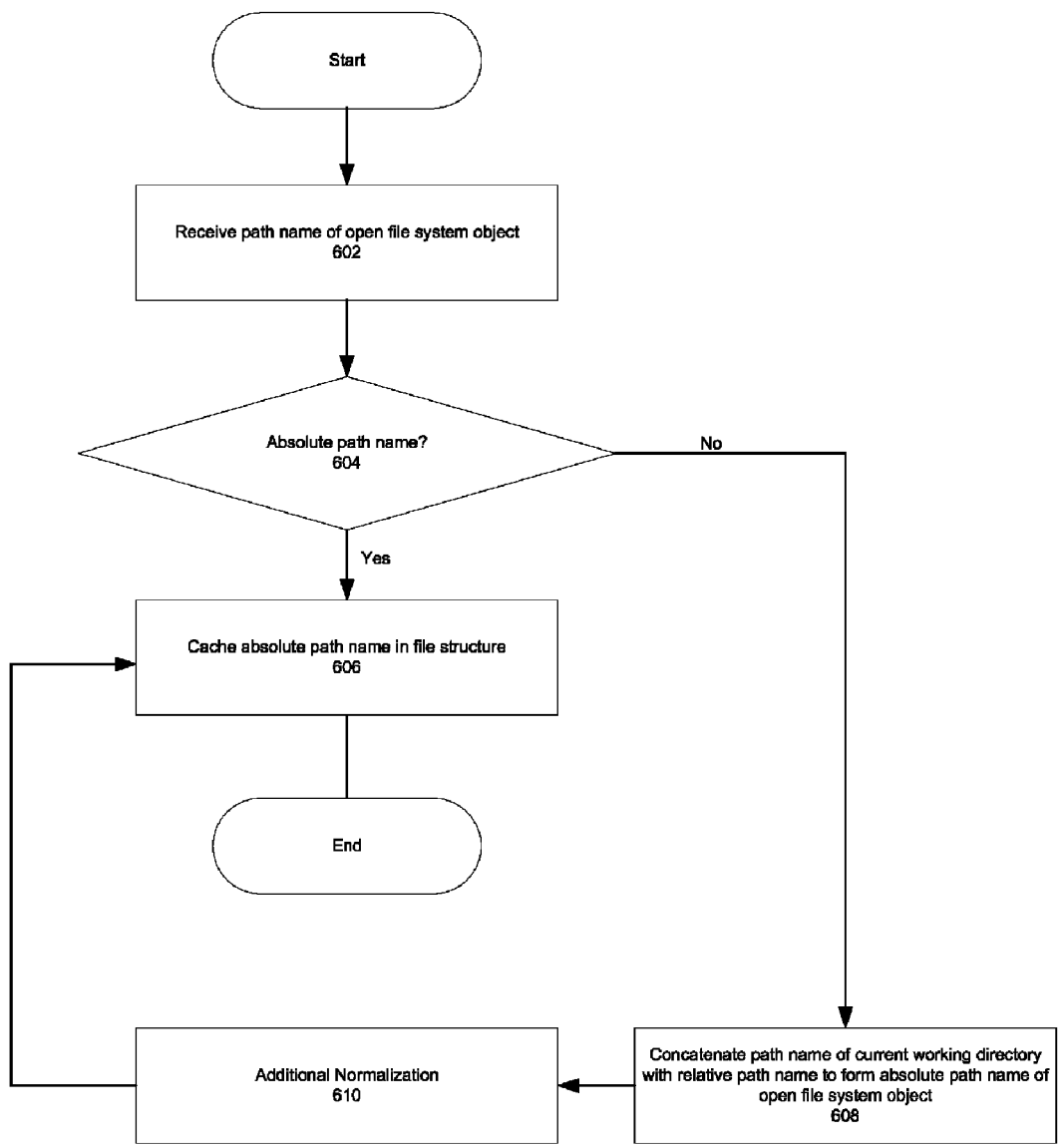
FIG. 6 a flowchart illustrating a process for obtaining an absolute path name for an open file system object in accordance with an illustrative embodiment.

Referring now to FIG. 6, a flowchart illustrating a process for identifying the absolute path name of an open file system object is shown in accordance with an illustrative embodiment. The process in FIG. 6 may be implemented by a kernel, such as kernel 306 in FIG. 3.

When a file system object is opened, the process begins by receiving a path name for the open file system object from the application that opened the file system object (step 602). The process makes a determination as to whether the path name is an absolute path name (step 604). If the path name received from the application is an absolute path name, the process caches the absolute path name in a path name field of a file structure associated with the open file system object (step 606) with the process terminating thereafter.

Returning to step 604, if a relative path name for the open file system object is received instead of the absolute path name for the open file system object, the process concatenates the path name of the current working directory with the relative path name to form the absolute path name of the open file system object (step 608).

Concatenating the absolute path name of the current working directory with the relative path name of the open file system object to form the absolute path name of the current working directory may be referred to as normalizing the relative path name of the open file system object. This step is shown in FIG. 6 below.

The process then performs any additional normalization that may be required (step 610). The process caches the absolute path name in the path name field of the file structure for the open file system structure (step 606) with the process terminating thereafter.

In this case, the absolute path name of the current working directory may be directly provided by a "chdir" function. However, in another example, the absolute path name of the current working directory may not be directly available, if, for example, a directory is changed using an "fchdir" function. In such a case, a reference to the current working directory is used to calculate the absolute path name of the current working directory using the special directory entry lookup method.

Figure 7:
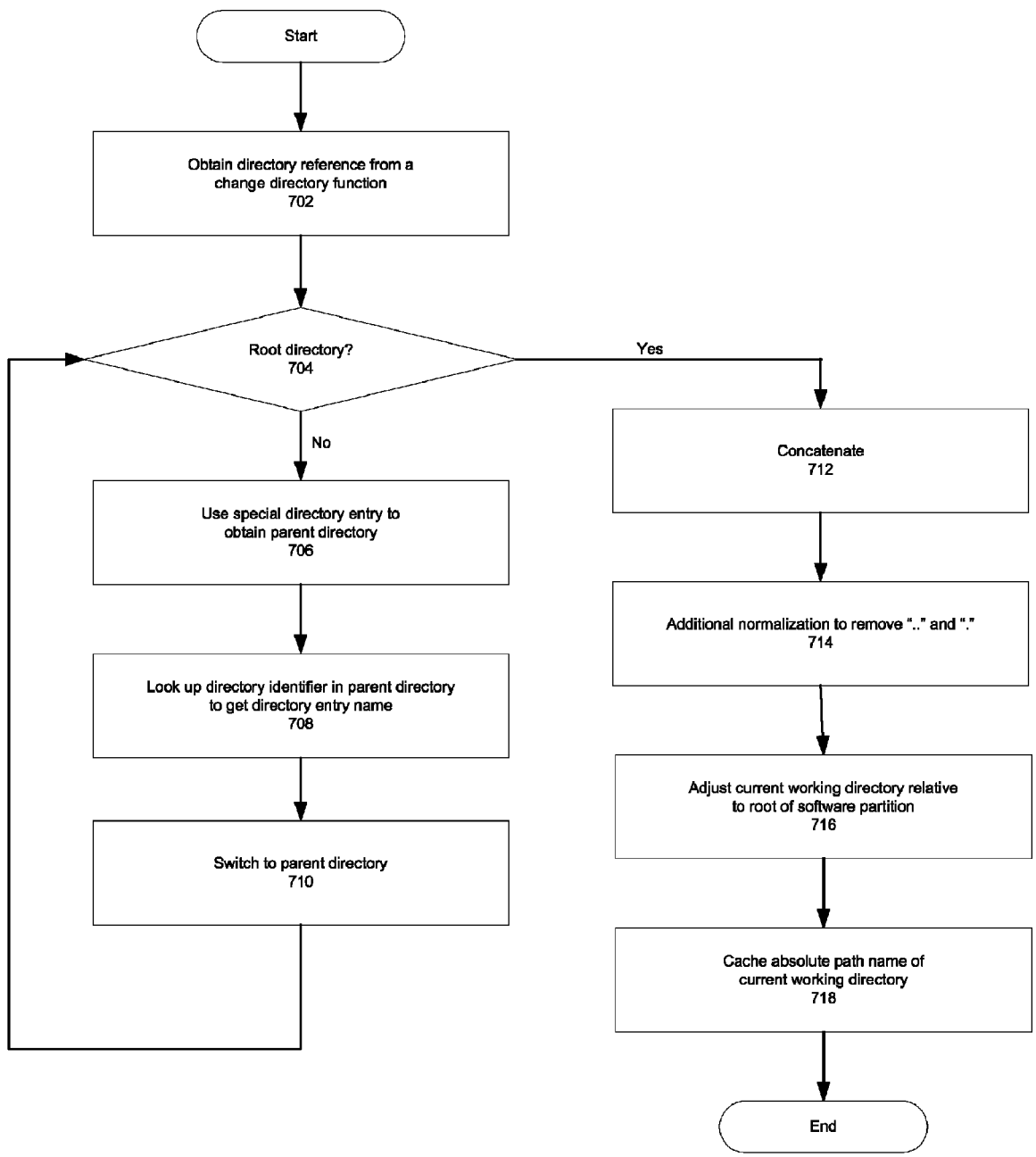
FIG. 7 is a flowchart illustrating a process for obtaining the absolute path name of the current working directory using a special directory entry method in accordance with an illustrative embodiment.

Turning now to FIG. 7, a flowchart illustrating a process for obtaining the absolute path name of the current working directory using a special directory entry method is depicted in accordance with an illustrative embodiment. In this example, the special directory entry method is used when the "fchdir" function is used to change the current working directory of the application. The process in FIG. 7 may be implemented by a kernel, such as kernel 306 in FIG. 3.

The process begins by obtaining a directory reference for a current working directory from a change directory function, such as, but not limited to, an "fchdir" function (step 702). The process then makes a determination as to whether the current working directory identified by the directory reference is a root directory (step 704). If the component is not a root directory, the process uses a special directory entry "." to obtain the parent directory (step 706). The process looks up the identifier for the directory in the parent directory to get the parent directory entry name (step 708). The process then switches to the parent directory (step 710). The process then returns to step 704 and determines whether the parent directory is the root directory (step 704). If the parent directory is not the root directory, the process iteratively performs steps 706-710 until the root directory is reached at step 704.

When the root directory component is reached, the process concatenates all the components identified by the process in reverse order to obtain the absolute path name of the current working directory (step 712). The process performs any additional normalization to remove '. . .' referencing a parent directory and/or '.' referencing a current working directory (step 714). The process then adjusts the current working directory relative to the root directory of the software partition (step 716) to form the absolute path name of the current working directory. The process caches the absolute path name of the current working directory (step 718) with the process terminating thereafter.

Figure 8:
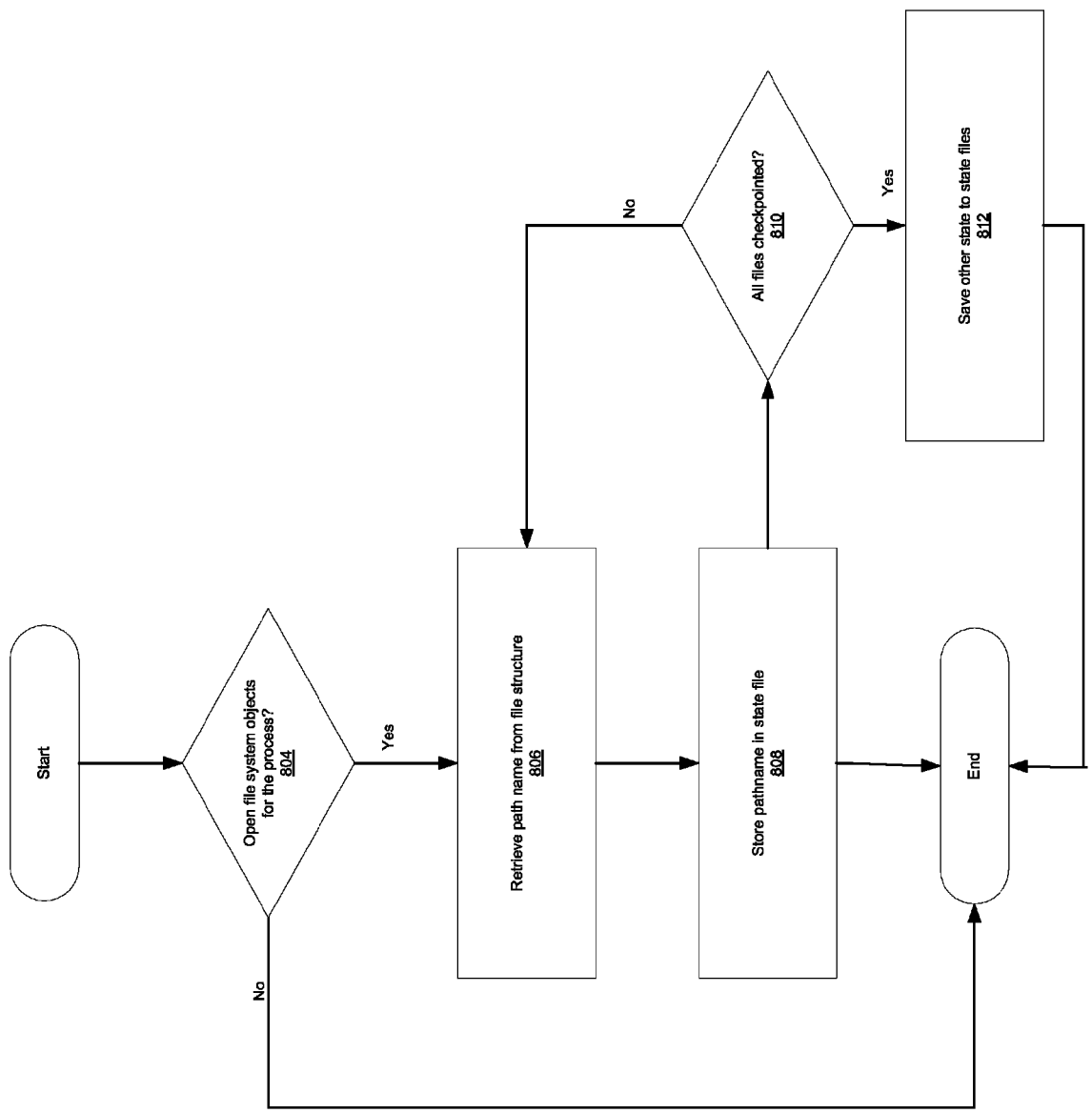
FIG. 8 is a flowchart illustrating a process for a departure server using the absolute path name cached in a file structure to migrate a software partition associated with an open file system object in accordance with an illustrative embodiment.

FIG. 8 is a flowchart illustrating a process for a departure server using the absolute path name cached in a file structure to migrate a software partition associated with an open file system object in accordance with an illustrative embodiment. The process may be implemented by a checkpoint process for gathering checkpoint data for a software partition. For example, the process may be implemented by a checkpoint process associated with process 320 in FIG. 3.

The process begins by making a determination as to whether a file system object associated with a process running in the software partition is open (step 804). If a file system object is not open, the process terminates thereafter.

Returning to step 804, if a file system object is open, the process retrieves the complete pathname from the pathname filed in the file structure (step 806). The process then stores the absolute pathname for the open file system object in a state file for use during migration of the software partition (step 808).

The process then makes a determination as to whether all files are checkpointed (step 810). In other words, the process determines if any other open file system objects have not been checkpointed. If all files associated with the software partition have not been checkpointed, the process returns to step 806 and iteratively executes steps 806-810 until all files are checkpointed. When all files associated with the software partition are checkpointed at step 810, the process saves the state data for the other open file system objects to state files (step 812) with the process terminating thereafter.

Figure 9:
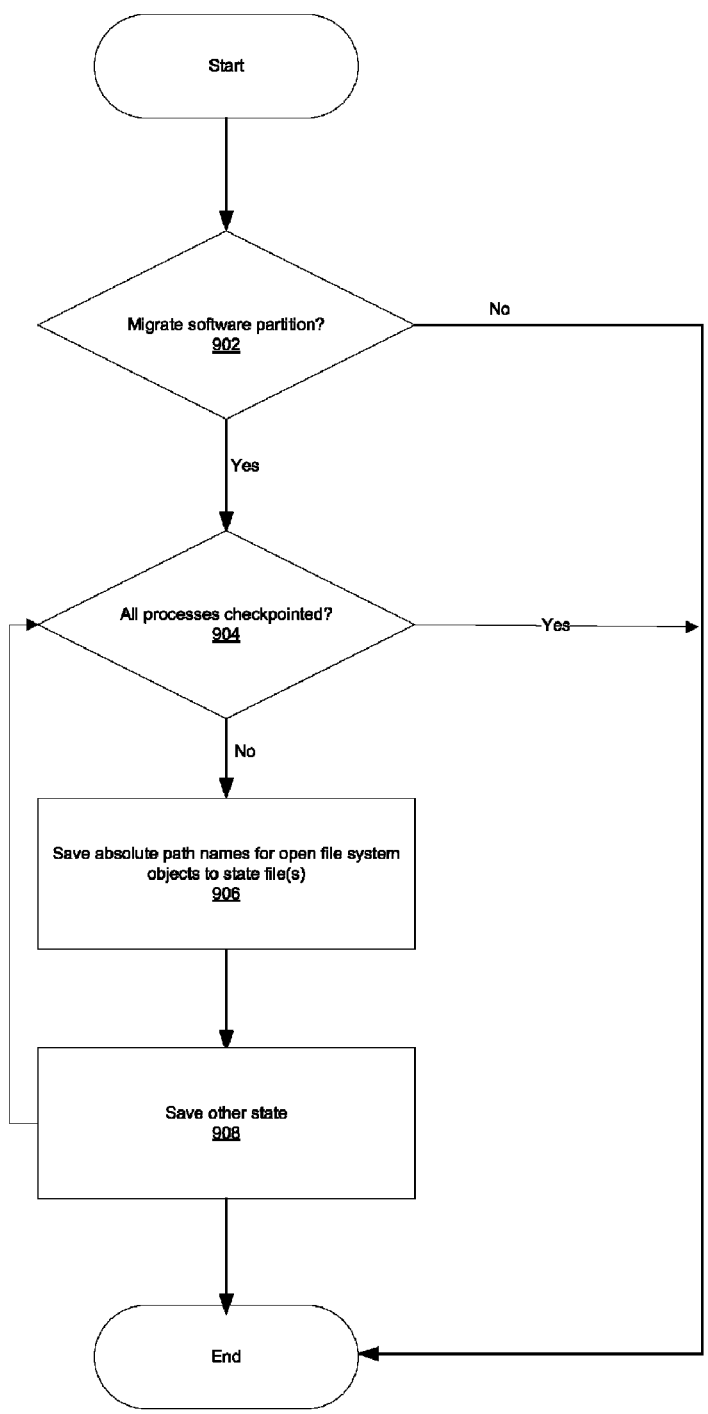
FIG. 9, a flowchart illustrating a process for an arrival server using the absolute path name cached in a file structure to migrate a software partition associated with an open file system object is depicted in accordance with an illustrative embodiment.

Turning now to FIG. 9, a flowchart illustrating a process for an arrival server using the absolute path name cached in a file structure to migrate a software partition associated with an open file system object is depicted in accordance with an illustrative embodiment. The process may be implemented by a checkpoint process for gathering checkpoint data for a software partition. For example, the process may be implemented by a checkpoint process associated with process 320 in FIG. 3.

The process begins by making a determination as to whether a software partition is being migrated to the arrival server (step 902). If a software partition is not being migrated, the process terminates thereafter.

If the software partition is being migrated, the process makes a determination as to whether all processes have been checkpointed (step 904). If all processes are checkpointed, the process terminates thereafter.

Returning to step 904, if all processes associated with the software partition have not been checkpointed, the process saves the absolute path names for open file system objects associated with processes running in the software partition to state file(s) (step 906). The process then saves any other state data for the processes (step 908) and returns to step 904 to make a determination as to whether all processes are checkpointed. If all processes are not checkpointed at step 904, the process continues executing steps 906-908 iteratively until all processes are checkpointed at step 904 with the process terminating thereafter.

Figure 10:
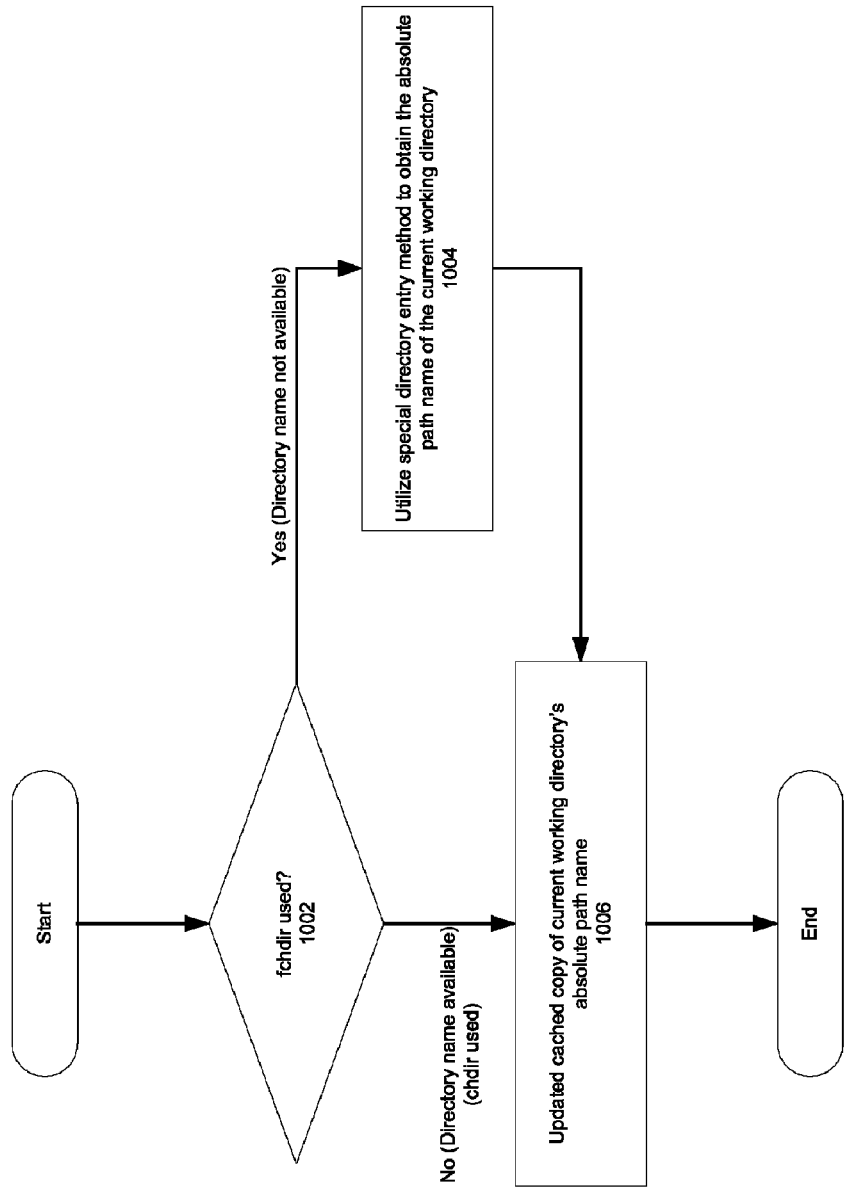
FIG. 10 is a flowchart illustrating a process for obtaining an absolute path name of a current working directory in accordance with an illustrative embodiment. The process may be implemented by a process for migrating a software partition.

FIG. 10 is a flowchart illustrating a process for obtaining an absolute path name of a current working directory in accordance with an illustrative embodiment. The process may be implemented by a process for migrating a software partition. For example, the process may be implemented by kernel 308 in FIG. 3.

The process begins by making a determination as to whether an "fchdir" change directory function was used to change directories (step 1002). If "fchdir" was used, the directory name is not available to the process and the process utilizes a special directory entry method to obtain the absolute path name of the current working directory (step 1004). After using the special directory entry method in step 1004 to obtain the absolute path name of the current working directory, or if "fchdir" was not used in step 1002, the process updates the cached copy of the current working directory's absolute path name (step 1006) with the process terminating thereafter.

Figure 11:
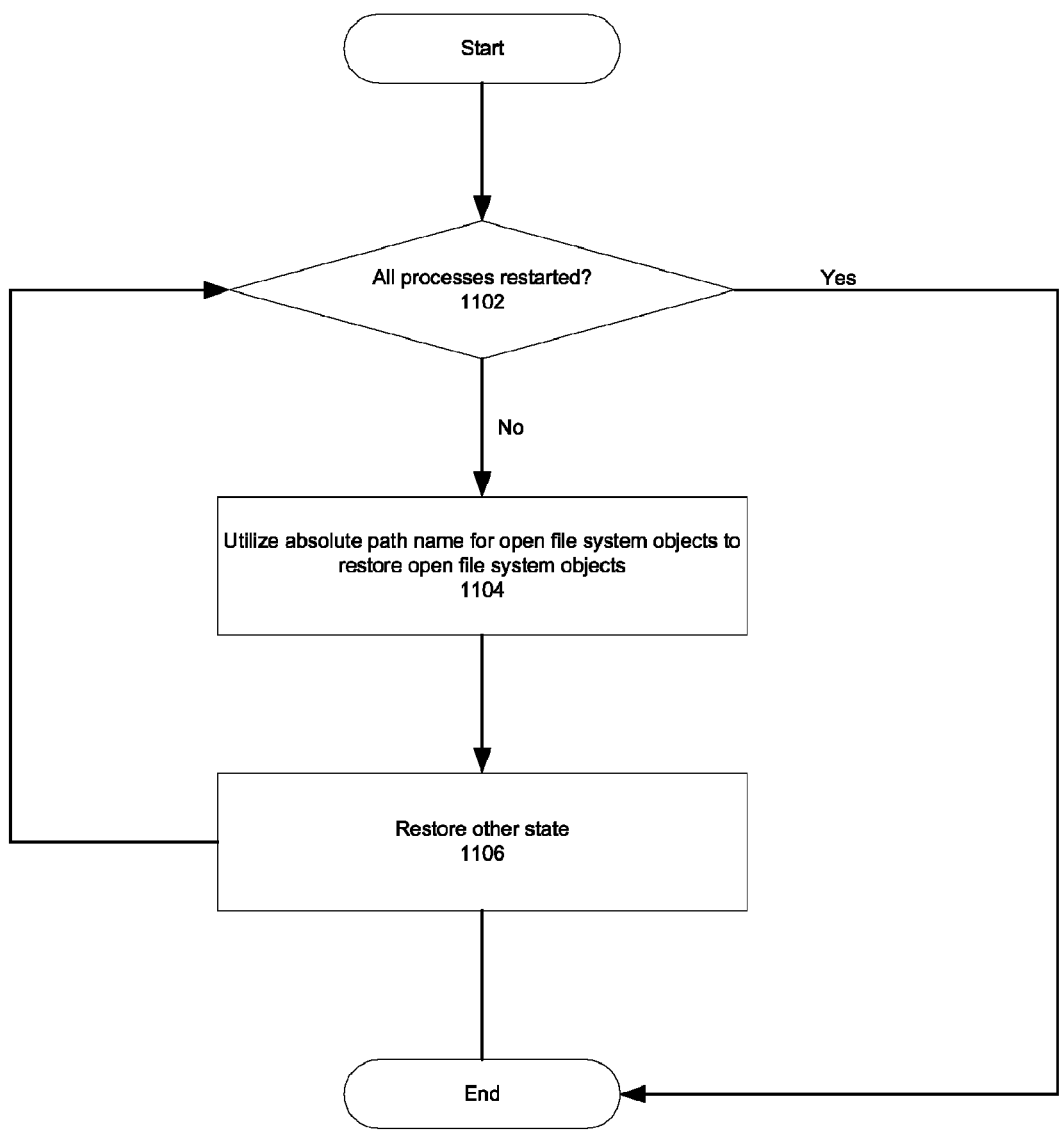
FIG. 11 is a flowchart illustrating a process for restarting processes on a software partition in accordance with an illustrative embodiment.

Turning now to FIG. 11, a flowchart illustrating a process for restarting processes on a software partition is depicted in accordance with an illustrative embodiment. The process may be implemented by a process for migrating a software partition. For example, the process may be implemented by kernel 308 in FIG. 3.

The process begins by making a determination as to whether all processes on the software partition are restarted (step 1102). If all processes running on the software partition are already restarted, the process terminates thereafter.

Returning to step 1102, if all the processes running on the software partition have not been restarted, the process utilizes the absolute path name for the open file system objects to restore open file system objects associated with the processes running on the software partition (step 1104). The process restores the other state of the processes running on the software partition using the other state data (step 1106) and returns to step 1102 to make a determination as to whether all processes are now restarted. If all processes are not restarted at step 1106, the process continues executing steps 1102-1106 iteratively until all processes are restarted at step 1102 with the process terminating thereafter.

The illustrative embodiments provide a computer implemented method, apparatus, and computer usable program code for obtaining an absolute path name for an open file system object. In one embodiment, a file descriptor for the open file system object is identified in response to a process in a first software partition opening a file system object to form the open file system object. The absolute path name for the open file system object is cached in a path name field in a file structure associated with the file descriptor for the open file system object, wherein the absolute path name for the open file system object in the path name field is used to migrate the process and the open file system object from the first software partition to a second software partition.

The illustrative embodiments permit a software partition that includes processes associated with open file system objects to be migrated onto a new software partition without suffering from any limitations due to hard links for a file in the same directory that are not distinguishable. In addition, the embodiments do not add any significant performance penalties during file open, checkpointing, and/or software partition migration.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tap, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for obtaining an absolute path name for an open file system object, the computer implemented method comprising:

creating, within a kernel, a separate file descriptor table for an opened process from among a plurality of processes with a separate entry in the file descriptor table for storing each file descriptor for each file system object from among a plurality of file system objects opened by the process, with each separate entry pointing to a separate file structure, and with a separate pathname field specified within each separate file structure;

responsive to a particular process in a first software partition opening a file system object from a file system stored in a data storage system associated with a first data processing system to form a particular open file system object from among the plurality of file system objects, determining, using a processor, whether a path name received from an application by the particular process for the particular open file system object is an absolute path name;

responsive to determining that the path name received by the particular process for the particular open file system object is not an absolute path name, normalizing a relative path name received for the particular open file system object to form the absolute path name;

identifying, using a processor, a particular file descriptor for the open file system object;

storing the file descriptor for the open file system object in a particular entry in the file descriptor table for the particular process;

caching, using the processor, the absolute path name for the particular open file system object in a particular path name field specified within a particular separate file structure associated with the particular entry for the file descriptor for the particular open file system object in the file descriptor table;

responsive to a determination that the first software partition is a mobile software partition that is configured to being migrated from the first data processing system to a second software partition different from the first software partition on a second data processing system, retrieving the absolute path name for the particular open file system object from the particular path name field in the particular separate file structure; and saving the absolute path name for the particular open file system object to a state file associated with the first software partition, wherein the absolute path name for the particular open file system object in the state file is used during migration of the first software partition to restore the particular open file system object in the second software partition from the data storage system.

2. The computer implemented method of claim 1 further comprising:

responsive to migrating the set of processes from the first software partition to the second software partition, retrieving, by a kernel associated with the second software partition, the absolute path name of the open file system object from the state file, wherein the absolute path name retrieved from the state file is used to restore the state of the open file system object in the second software partition.

3. The computer implemented method of claim 1 wherein the first software partition is located on a first data processing system and the second software partition is located on a second data processing system.

4. The computer implemented method of claim 1 wherein the first software partition is a different software partition than the second software partition and wherein the first software partition and the second software partition are located on the same data processing system.

5. The computer implemented method of claim 1 wherein normalizing the relative path name to form the absolute path name further comprises:
   retrieving the absolute path name for a current working directory; and
   concatenating the absolute path name of the current working directory with the relative path name of the open file system object to form the absolute path name of the open file system object.

6. The computer implemented method of claim 5 wherein retrieving an absolute path name for a current working directory further comprises:
   identifying a last component in the absolute path name for the open file system object;
   identifying a parent directory of the last component in the absolute path name for the open file system object using a special directory entry lookup function;
   identifying a name of a next component in the absolute path name of the current working directory using an identifier of the next component.

7. The computer implemented method of claim 6 further comprising:
   responsive to a determination that the parent directory is not a root directory, using the special directory entry to identify a next parent directory; and
   looking up the name of the next component in the absolute path name of the current working directory in the next parent directory using a file identifier for the parent directory until the root directory is reached to form a set of component names.

8. The computer implemented method of claim 7 further comprising:
   concatenating the set of component names in reverse order to form the absolute path name for the current working directory.

9. The computer implemented method of claim 8 further comprising:
   caching the absolute path name for the current working directory in the file structure associated with the file descriptor for the open file system object.

10. The computer implemented method of claim 1 further comprising:
    responsive to closing the open file system object, removing the absolute path name for the open file system object from the path name filed in the file structure.

11. The computer implemented method of claim 1 further comprising:
    responsive to opening a file to form the open file system object, adding the path name field to the file structure associated with the file descriptor, wherein the file structure comprises a pointer to a virtual node for the open file system object in a virtual file system layer on top of a physical file system, wherein the virtual node comprises an inode pointer to an inode data structure in the physical file system, wherein the inode data structure comprises information identifying a location of the file in the physical file system.

12. A computer program product comprising:
    a computer-readable medium including computer usable program code for obtaining an absolute path name for an open file system object, said computer program product comprising:
    computer usable program code for creating, within a kernel, a separate file descriptor table for an opened process from among a plurality of processes with a separate entry in the file descriptor table for storing each file descriptor for each file system object from among a plurality of file system objects opened by the process, with each separate entry pointing to a separate file structure, and with a separate pathname field specified within each separate file structure;
    computer usable program code, responsive to a particular process in a first software partition opening a file system object from a file system stored in a data storage system associated with a first data processing system to form a particular open file system object from among the plurality of file system objects, for determining whether a path name received from an application by the particular process for the particular open file system object is an absolute path name;
    computer usable program code, responsive to determining that the path name received by the particular process for the particular open file system object is not an absolute path name, for normalizing a relative path name received for the particular open file system object to form the absolute path name
    computer usable program code for identifying a particular file descriptor for the open file system object;
    computer usable program code for storing the file descriptor for the open file system object in a particular entry in the file descriptor table for the particular process;
    computer usable program code for caching the absolute path name for the particular open file system object in a particular path name field specified within a particular separate file structure associated with the particular entry for the file descriptor for the particular open file system object in the file descriptor table;
    computer usable program code, responsive to a determination that the first software partition is a mobile software partition that is configured to being migrated from the first data processing system to a second software partition different from the first software partition on a second data processing system, for retrieving the absolute path name for the particular open file system object from the particular path name field in the particular separate file structure; and
    computer usable program code for saving the absolute path name for the particular open file system object to a state file associated with the first software partition, wherein the absolute path name for the particular open file system object in the state file is used during migration of the first software partition to restore the particular open file system object in the second software partition from the data storage system.

13. The computer program product of claim 12 further comprising:
    computer usable program code for retrieving, by a kernel associated with the second software partition, the absolute path name of the open file system object from the state file in response to migrating the set of processes from the first software partition to the second software partition, wherein the absolute path name retrieved from the state file is used to restore the state of the open file system object in the second software partition.

14. An apparatus comprising:
    a bus system;
    a communications system connected to the bus system;
    a memory connected to the bus system, wherein the memory includes computer usable program code; and
    a processing unit connected to the bus system, wherein the processing unit executes the computer usable program code to:
    create, within a kernel, a separate file descriptor table for an opened process from among a plurality of processes with a separate entry in the file descriptor table for storing each file descriptor for each file system object from among a plurality of file system objects opened by the process, with each separate entry pointing to a separate file structure, and with a separate pathname field specified within each separate file structure;

responsive to a particular process in a first software partition opening a file system object from a file system stored in a data storage system associated with a first data processing system to form a particular open file system object from among the plurality of file system objects, determine whether a path name received from an application by the particular process for the particular open file system object is an absolute path name;

responsive to determining that the path name received by the particular process for the particular open file system object is not an absolute path name, normalize a relative path name received for the particular open file system object to form the absolute path name;

identify a particular file descriptor for the open file system object;

store the file descriptor for the open file system object in a particular entry in the file descriptor table for the particular process;

cache the absolute path name for the particular open file system object in a particular path name field specified within a particular separate file structure associated with the particular entry for the file descriptor for the particular open file system object in the file descriptor table;

responsive to a determination that the first software partition is a mobile software partition that is configured to being migrated from the first data processing system to a second software partition different from the first software partition on a second data processing system, retrieve the absolute path name for the particular open file system object from the particular path name field in the particular separate file structure; and save the absolute path name for the particular open file system object to a state file associated with the first software partition, wherein the absolute path name for the particular open file system object in the state file is used during migration of the first software partition to restore the particular open file system object in the second software partition from the data storage system.

* * * * *